United States Patent
Ji et al.

(10) Patent No.: US 10,962,812 B2
(45) Date of Patent: Mar. 30, 2021

(54) ELECTRO-OPTIC MODULATOR

(71) Applicant: InnoLight Technology (Suzhou) LTD., Jiangsu (CN)

(72) Inventors: Mengxi Ji, Jiangsu (CN); Xianyao Li, Jiangsu (CN); Yue Xiao, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

(21) Appl. No.: 16/807,544

(22) Filed: Mar. 3, 2020

(65) Prior Publication Data

US 2020/0285084 A1 Sep. 10, 2020

(30) Foreign Application Priority Data

Mar. 5, 2019 (CN) .......................... 201910163827.7

(51) Int. Cl.
| | | |
|---|---|---|
| *G02F 1/025* | (2006.01) | |
| *G02F 1/225* | (2006.01) | |
| *G02F 1/015* | (2006.01) | |
| *G02F 1/035* | (2006.01) | |

(52) U.S. Cl.
CPC ............ *G02F 1/025* (2013.01); *G02F 1/2257* (2013.01); *G02F 1/0356* (2013.01); *G02F 2001/0151* (2013.01)

(58) Field of Classification Search
None
See application file for complete search history.

(56) References Cited

U.S. PATENT DOCUMENTS

| | | | |
|---|---|---|---|
| 7,085,443 B1 * | 8/2006 | Gunn, III | ................ G02F 1/025 359/245 |
| 9,229,251 B2 | 1/2016 | Akiyama et al. | |
| 2017/0075148 A1 | 3/2017 | Baudot et al. | |

FOREIGN PATENT DOCUMENTS

| | | |
|---|---|---|
| CN | 105974612 A | 9/2016 |
| CN | 104321849 B | 2/2017 |
| CN | 106547122 A | 3/2017 |
| WO | WO 2015/149226 A1 | 10/2015 |

* cited by examiner

*Primary Examiner* — Jerry Rahll
(74) *Attorney, Agent, or Firm* — Finnegan, Henderson, Farabow, Garrett & Dunner, LLP

(57) ABSTRACT

An electro-optic modulator includes a doped structure disposed on a top silicon layer of a substrate. The doped structure includes an optical waveguide, and a first P-type doped region and a first N-type doped region disposed respectively on two sides of the optical waveguide. The first P-type doped region is connected to the optical waveguide by means of a plurality of P-type doped link arms, and the first N-type doped region is connected to the optical waveguide by means of a plurality of N-type doped link arms. End portions of the plurality of P-type doped link arms and end portions of the plurality of N-type doped link arms are alternately arranged along a direction of light propagation to form PN junction depletion layers. The PN junction depletion layers are periodically arranged along the direction of light propagation to form the optical waveguide.

12 Claims, 7 Drawing Sheets

ELECTRO-OPTIC MODULATOR

CROSS-REFERENCE TO RELATED APPLICATION

This application is based upon and claims priority to Chinese Patent Application 201910163827.7, filed on Mar. 5, 2019, the entire content of which is incorporated herein by reference.

FIELD OF THE DISCLOSURE

The present disclosure relates to the field of semiconductor technology and, more particularly, to an electro-optic modulator.

BACKGROUND

A silicone-based electro-optic modulator is one of the most important active devices on a silicon-based optoelectronic chip and plays a crucial role in high-speed optical communication. Such a modulator functions to convert a rapidly changing electrical signal to a rapidly changing optical signal.

For silicon optical chips used to transmit faster than 25 Gbps by single wavelength, the most feasible and commonly used technical solution at present is a Carrier Depletion Modulator based on a plasma dispersion effect. In this solution, the structure of a phase shifter is as shown in FIG. 1, including a P-type doping region 11' and an N-type doping region 12' that form a ridge waveguide 10', as well as a P-type electrode and an N-type electrode that are connected to the two sides of the ridge waveguide 10'. A slab area 20' of the ridge waveguide 10' requires partial etching. Therefore, it is relatively difficult to control the thickness of the slab area 20' of the ridge waveguide 10', causing the device to suffer from poor uniformity. In addition, the thickness of the slab area 20' of the ridge waveguide 10' is small and the electrical resistance is high, thus limiting the bandwidth of the modulator.

SUMMARY

Purposes of the present disclosure include providing an electro-optic modulator that offers advantages such as high bandwidth, low losses, and high modulation efficiency.

To achieve one or more of the aforementioned purposes, one embodiment of the present disclosure provides an electro-optic modulator including a doped structure disposed on a top silicon layer of a substrate. The doped structure includes an optical waveguide, and a first P-type doped region and a first N-type doped region disposed respectively on two sides of the optical waveguide. The first P-type doped region is connected to the optical waveguide by means of a plurality of P-type doped link arms. The first N-type doped region is connected to the optical waveguide by means of a plurality of N-type doped link arms. End portions of the plurality of P-type doped link arms and end portions of the plurality of N-type doped link arms are alternately arranged along a direction of light propagation to form PN junction depletion layers perpendicular to the direction of light propagation. The PN junction depletion layers are periodically arranged along the direction of light propagation to form the optical waveguide. The end portion of each P-type doped link arm is a segment of the P-type doped link arm positioned away from the first P-type doped region. The extremity of each N-type doped link arm is a segment of the N-type doped link arm positioned away from the first N-type doped region. The doping concentration in the first P-type doped region is higher than the doping concentration in the P-type doped link arms. The doping concentration in the first N-type doped region is higher than the doping concentration in the N-type doped link arms.

DETAILED DESCRIPTION

Figure 1:
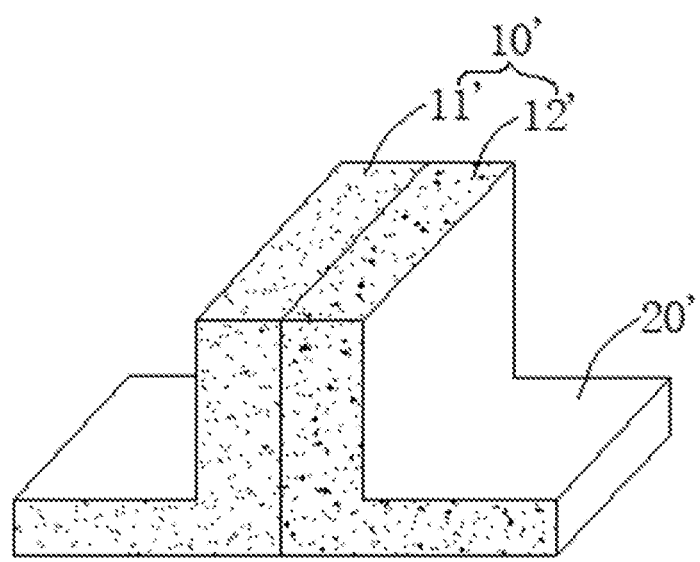
FIG. 1 is a structural diagram illustrating a conventional ridge waveguide doped structure.

The text below provides a detailed description of the present disclosure with reference to specific embodiments illustrated in the attached drawings. However, these embodiments do not limit the present disclosure. The scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present disclosure are only for the purpose of illustrating the basic structure of the subject matter of the present disclosure.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When a component or layer is said to be "above" another part or layer or "connected to" another part or layer, it may be directly above the other part or layer or directly connected to the other part or layer, or there may be an intermediate component or layer.

First Example Embodiment

Figure 2:
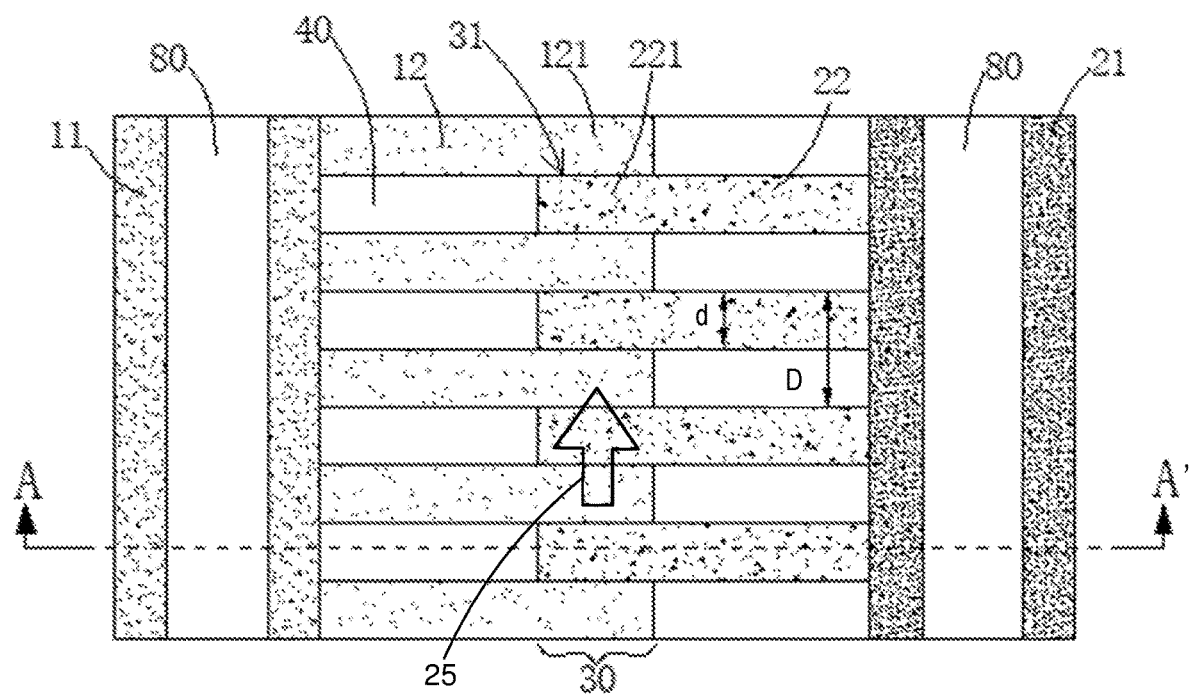
FIG. 2 is a top view of an electro-optic modulator of a first example embodiment of the present disclosure.
Figure 3:
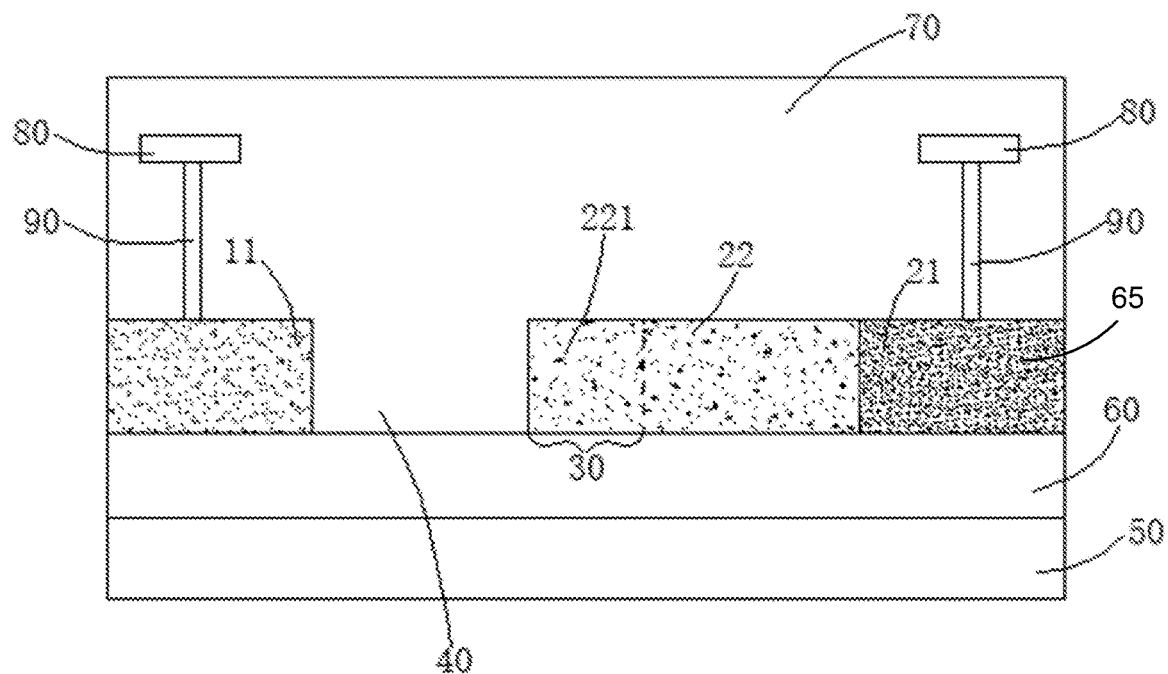
FIG. 3 illustrates a cross section of the electro-optic modulator in FIG. 2 along section A-A'.
Figure 4:
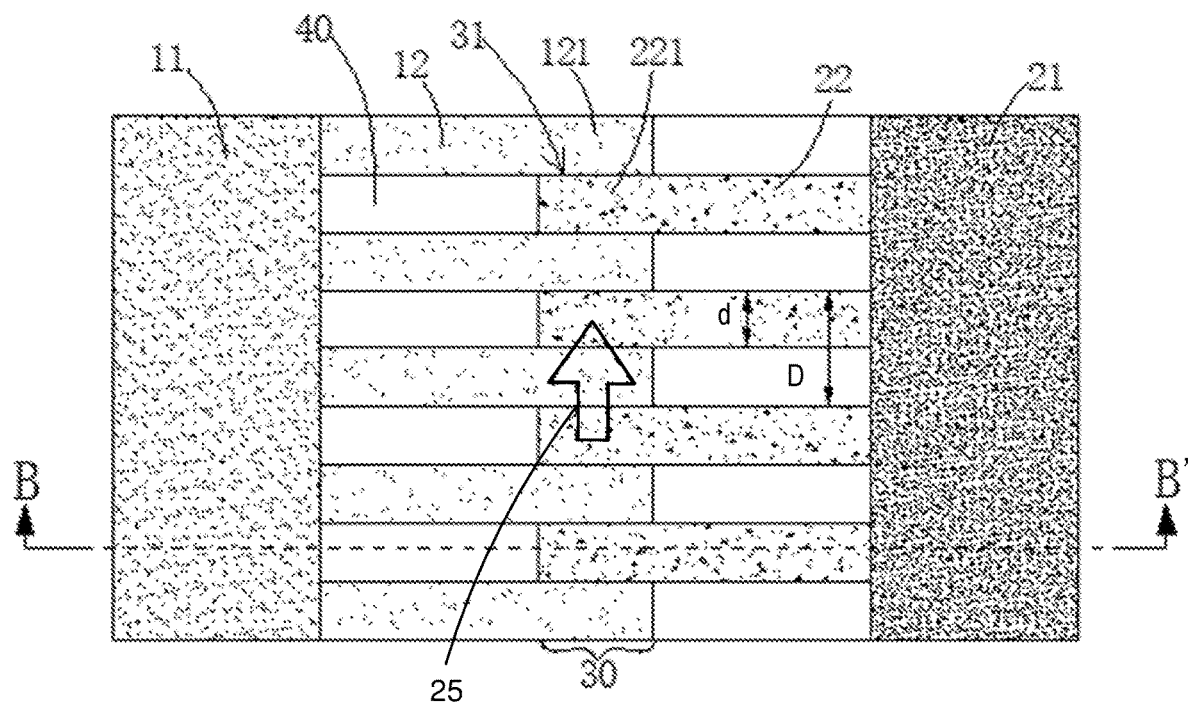
FIG. 4 is a top view of a doped structure of an electro-optic modulator of the first example embodiment of the present disclosure.
Figure 5:
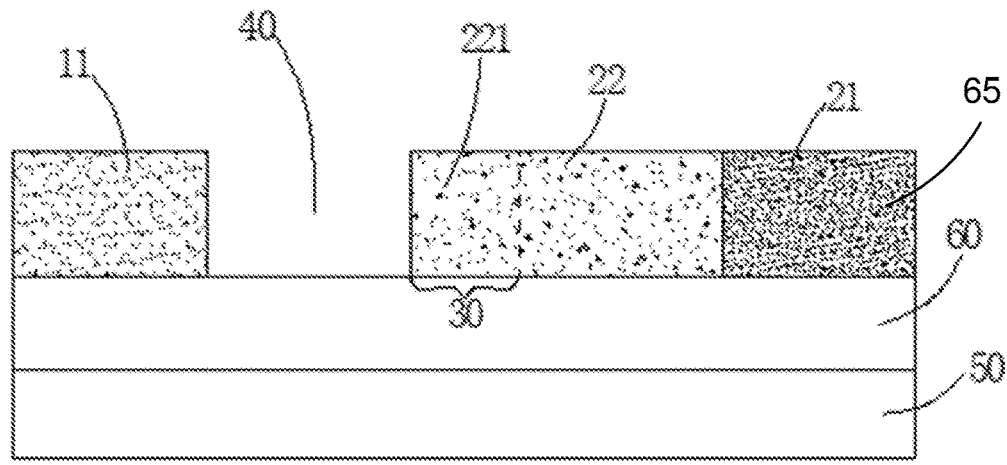
FIG. 5 illustrates a cross section of the doped structure in FIG. 4 along section B-B'.

FIG. 2 is a top view of an electro-optic modulator of a first example embodiment of the present disclosure. FIG. 3 illustrates a cross section of the electro-optic modulator in FIG. 2 along section A-A'. FIG. 4 is a top view of a doped structure of the electro-optic modulator of the first example embodiment of the present disclosure. FIG. 5 illustrates a cross section of the doped structure in FIG. 4 along section B-B'. As shown in FIGS. 2 and 3, the electro-optic modulator according to the first example embodiment includes a doped structure disposed on a top silicon layer 65 of a silicon-on-insulator (SOI) structure. The SOI structure includes a silicon substrate 50, a buried oxide layer 60 on the silicon substrate 50, and the top silicon layer 65 on the buried oxide layer 60. As shown in FIGS. 4 and 5, the doped structure includes an optical waveguide 30, and a first P-type doped region 11 and a first N-type doped region 21 disposed respectively on two sides of the optical waveguide 30. The first P-type doped region 11 is connected to the optical waveguide 30 by means of a plurality of P-type doped link arms 12. The first N-type doped region 21 is connected to the optical waveguide 30 by means of a plurality of N-type doped link arms 22. In this example embodiment, the P-type doped link arms 12, N-type doped link arms 22, and optical waveguide 30 are the same in thickness, all of which extend through a top surface and a bottom surface of the doped structure and may be produced by using the technique of full etching.

End portions 121 of the plurality of P-type doped link arms 12 and end portions 221 of the plurality of N-type doped link arms 22 are alternately arranged along a direction of light propagation (as indicated by an arrow 25 in FIG. 4) to form PN junction depletion layers 31 each being perpendicular to the direction of light propagation. The PN junction depletion layers 31 are periodically arranged along the direction of light propagation to form the optical waveguide 30. The end portion 121 of each P-type doped link arm 12 is a segment of the P-type doped link arm 12 positioned away from the first P-type doped region 11. The end portion 221 of each N-type doped link arm 22 is a segment of the N-type doped link arm 22 positioned away from the first N-type doped region 21.

The doping concentration in the first P-type doped region 11 is higher than the doping concentration in the P-type doped link arms 12. The doping concentration in the first N-type doped region 21 is higher than the doping concentration in the N-type doped link arms 22. In this example embodiment, the P-type doped link arms 12 and N-type doped link arms 22 have the same doping concentration. The doping concentration in the P-type doped link arms 12 is "P doping", and the doping concentration in the N-type doped link arms 22 is "N doping". The doping concentrations of both of the P doping and the N doping are in the range of $1 \times 10^{17}$ cm$^{-3}$ to $5 \times 10^{18}$ cm$^{-3}$. The first P-type doped region 11 and the first N-type doped region 21 have the same high doping concentration. That is, the doping in the first P-type doped region 11 is "P++ doping", and the doping in the first N-type doped region 21 is "N++ doping". The doping concentrations of both of the P++ doping and the N++ doping are in the range of $1 \times 10^{19}$ cm$^{-3}$ to $1 \times 10^{23}$ cm$^{-3}$.

In the first example embodiment, a plurality of the P-type doped link arms 12 are disposed along the direction of light propagation to form a grating structure with a duty cycle of 50%; and a plurality of the N-type doped link arms 22 are disposed along the direction of light propagation to form a grating structure with a duty cycle of 50%. Here, duty cycle is defined as the ratio of a width d of a single link arm to a grating period D of the grating structure: d/D. Doped link arms of a fully etched grating structure are used to connect the optical waveguide and the highly doped regions that are connected to the electrodes. In other words, the doped link arms are used to electrically connect the PN junction depletion layers 31, that form the optical waveguide 30, to the first P-type doped region 11, and to the first N-type doped region 21. The full etching process enables good uniformity of the device, thus solving the problem of poor device uniformity caused by difficulty in controlling the thickness of the partially etched structure with currently available technology. The duty cycle of the grating of the doped link arms may also be greater than or equal to 50%, which increases the cross-sectional area of the doped link arms used for electricity conduction without changing the thickness of the device. Therefore, the resistance of the doped link arms can be effectively reduced, thus facilitating a higher bandwidth of the modulator. The duty cycle of the grating of the doped link arms may also be in the range of 10% to 50%.

The doping structure of the first example embodiment of the present disclosure enables an optical signal to work in a Transverse Magnetic (TM) mode. In the TM mode, evanescent waves propagating in an optical waveguide exist mainly in the top and bottom portions of the optical waveguide and have relatively little interaction with highly doped regions on the two sides of the optical waveguide. Therefore, optical losses can be reduced effectively. Additionally, a conventional ridge waveguide usually causes an optical signal to work in a Transverse Electric (TE) mode. In the TE mode, interactions between the optical signal and side walls of the ridge waveguide are strong, and the side walls of the waveguide are formed by etching and are relatively rough; therefore, optical losses are more significant. In the doped structure of the first example embodiment of the present disclosure, an optical signal can work in the TM mode. In the TM mode, interactions between the optical signal and the top and bottom portions of the waveguide are relatively strong, and the top and bottom surfaces of the waveguide are less rough, resulting in lower optical losses. Therefore, the doped structure of the first example embodiment can also effectively reduce optical losses. As shown in FIG. 4, in the first example embodiment, the width of the P-type doped link arms 12 and the width of the N-type doped link arms 22 are the same, each type of link arms forming a side-wall grating with a duty cycle of 50%. In the optical waveguide 30, the end portions 121 of the P-type doped link arms 12 and the end portions 221 of the N-type doped link arms 22 are alternately arranged along the direction of light propagation to form the PN junction depletion layers 31 perpendicular to the direction of light propagation, thus increasing the effective length of the PN junction depletion layers 31 in the optical waveguide and improving modulation efficiency.

As shown in FIGS. 2 and 3, the electro-optic modulator may also include a cladding layer 70 disposed on the doped structure. The cladding layer 70 fills the gaps 40 between the P-type doped link arms 12 and the gaps 40 between the N-type doped link arms 22. The cladding layer 70 may be made of a transparent and electrical insulating material, such as SiO$_2$ or SiN, whose refractive index is lower than that of silicon. At least two electrodes 80 are further disposed in the cladding layer 70. The first P-type doped region 11 is electrically connected to one of the two electrodes 80, and the first N-type doped region 21 is electrically connected to the other one of the two electrodes 80. The first P-type doped region 11 is connected to one of the two electrodes 80 by a via 90, and the first N-type doped region 21 is connected to the other one of the two electrodes 80 by another via 90. When the device is in operation, the first P-type doped region 11 is electrically connected to one of the two electrodes that has a relatively lower electric potential, and the first N-type doped region 21 is electrically connected to the other one of the two electrodes that has a relatively higher electric potential. In other words, when the device is in operation, a relatively lower electric potential is applied to the electrode 80 that is connected to the first P-type doped region 11, and a relatively higher electric potential is applied to the electrode 80 that is connected to the first N-type doped region 21, thus extending the PN junction depletion layers and causing the effective refractive index of the optical waveguide 30 to change, thereby producing a phase shift and realizing electro-optic modulation.

A method for fabricating the electro-optic modulator of the first example embodiment will be explained next. First, an SOI wafer or chip is selected. Next, a full etching process is applied to the top silicon layer 65 of the SOI wafer or chip to etch and form the optical waveguide 30, the first P-type doped region 11, the first N-type doped region 21, the link arms that connect the first P-type doped region 11 to the optical waveguide 30, and the link arms that connect the first N-type doped region 21 to the optical waveguide 30. An ion implantation process is performed to implant various concentrations of P-type doping ions and various concentrations of N-type doping ions into the optical waveguide 30, first P-type doped region 11, first N-type doped region 21, and link arms, respectively, to form the P-type doped link arms 12 that connect the first P-type doped region 11 to the optical waveguide 30 and to form the N-type doped link arms 22 that connect the first N-type doped region 21 to the optical waveguide 30. On the optical waveguide 30, the P-type doped link arms 12 and the N-type doped link arms 22 are alternately arranged along the direction of light propagation to form the PN junction depletion layers 31 perpendicular to the direction of light propagation. Thermal annealing is then performed to repair lattice damages and activate impurities, thus completing the fabrication of the doped structure. Finally, a cladding layer 70 is deposited onto the doped structure. In the cladding layer 70, an electrode 80 is disposed at a location corresponding to the first P-type doped region 11, and another electrode 80 is disposed at a location corresponding to the first N-type doped region 21. Vias 90 are arranged to connect the electrodes 80 to the first P-type doped region 11 and to the first N-type doped region 21, respectively. The first P-type doped region 11 and the first N-type doped region 21 are each electrically connected to its corresponding electrode 80 by a via 90. The "full etching" process mentioned above refers to an etching process having an etching depth that is the same as the thickness of the top silicon layer 65 on the buried oxide layer 60. In other words, the top silicon layer 65 is etched from the top surface thereof to the bottom surface thereof. Therefore, the thickness of the link arms is the same as the thickness of the top silicon layer 65, resulting in good uniformity of the device. In contrast, a "partial etching" process refers to an etching process having an etching depth that is less than the thickness of the top silicon layer 65. In this case, since it is difficult to control the etching depth, it is difficult to control the thickness of the slab area 20' of the ridge waveguide 10' as shown in FIG. 1. Therefore, partial etching leads to poor uniformity of the device.

In other example embodiments, a transition electrode may be disposed on each one of the via that connects to the first P-type doped region and the via that connects to the first N-type doped region.

Second Example Embodiment

Figure 6:
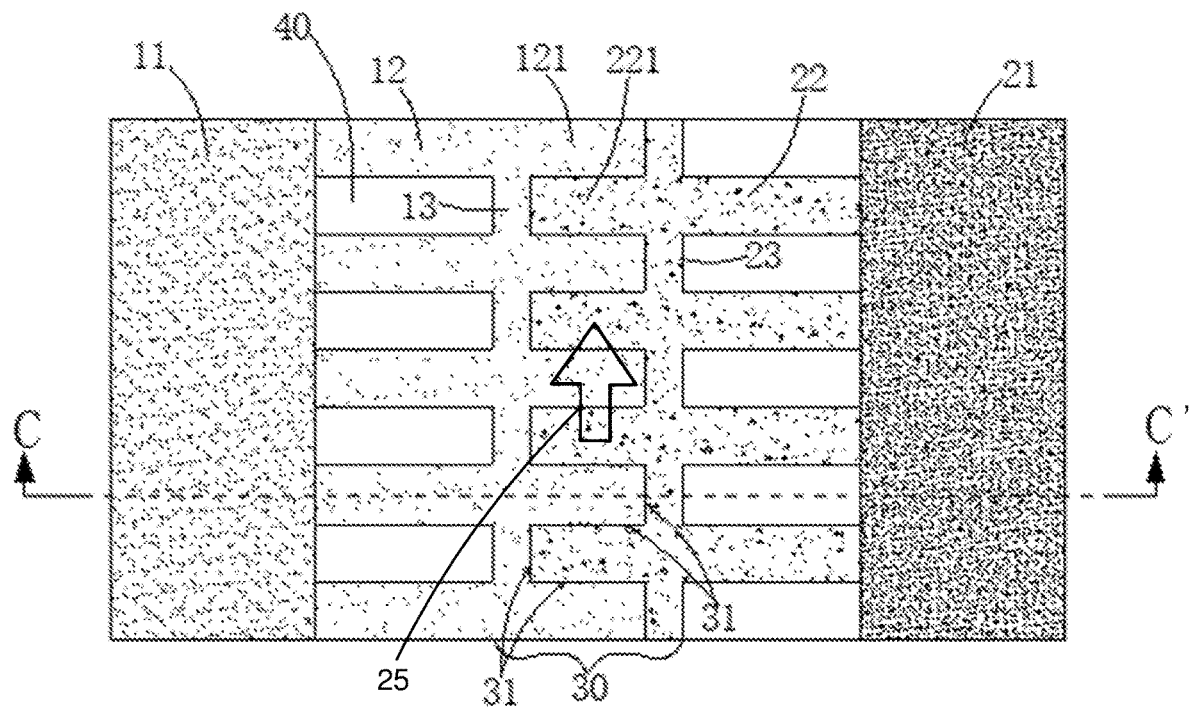
FIG. 6 is a top view of a doped structure of an electro-optic modulator of a second example embodiment of the present disclosure.
Figure 7:
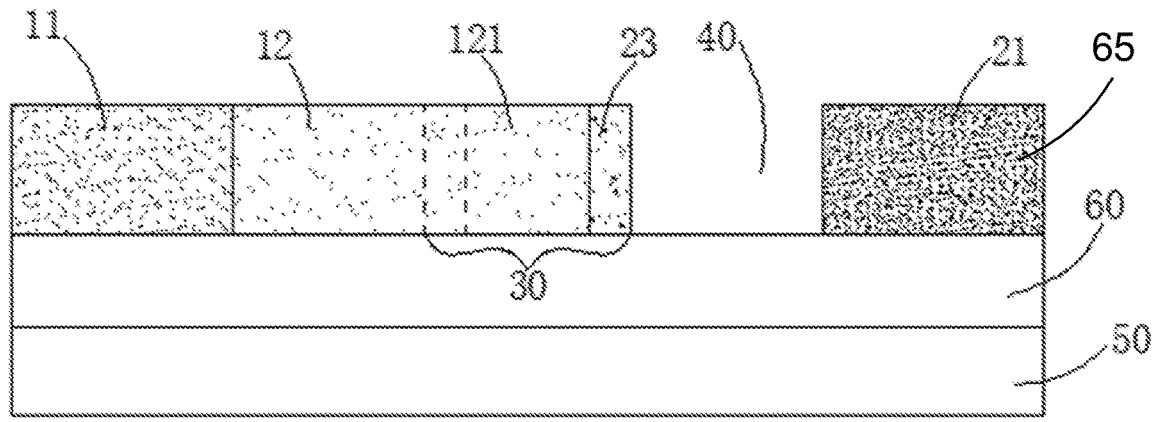
FIG. 7 illustrates a cross section of the doped structure in FIG. 6 along section C-C'.

FIG. 6 is a top view of a doped structure of an electro-optic modulator in a second example embodiment of the present disclosure. FIG. 7 illustrates a cross section of the doped structure in FIG. 6 along section C-C'. As shown in FIGS. 6 and 7, the second example embodiment differs from the first example embodiment in that, in the second example embodiment, a second P-type doped region 13 that connects two adjacent P-type doped link arms 12 is further disposed abutting an end of the end portion 221 of one of the N-type doped link arms 22; and a second N-type doped region 23 that connects two adjacent N-type doped link arms 22 is further disposed abutting an end of the end portion 121 of one of the P-type doped link arms 12.

In the second example embodiment, the doping concentrations in the second P-type doped region 13 and in the end portions 121 of the P-type doped link arms 12 are the same, both being P-type doping at a concentration in the range of $1 \times 10^{17}$ cm$^{-3}$ to $5 \times 10^{18}$ cm$^{-3}$. Similarly, the doping concentrations in the second N-type doped region 23 and in the end portions 221 of the N-type doped link arms 22 are the same, both being N-type doping at a concentration in the range of $1 \times 10^{17}$ cm$^{-3}$ to $5 \times 10^{18}$ cm$^{-3}$.

The end portions 121 of the P-type doped link arms 12 and the end portions 221 of the N-type doped link arms 22 are alternately arranged along the direction of light propagation to form PN junction depletion layers 31 perpendicular to the direction of light propagation. These PN junction depletion layers 31 are periodically arranged along the direction of light propagation to form the optical waveguide 30. The doping structure of the second example embodiment further increases the effective length of the PN junction depletion layers 31 and improves modulation efficiency.

Figure 8:
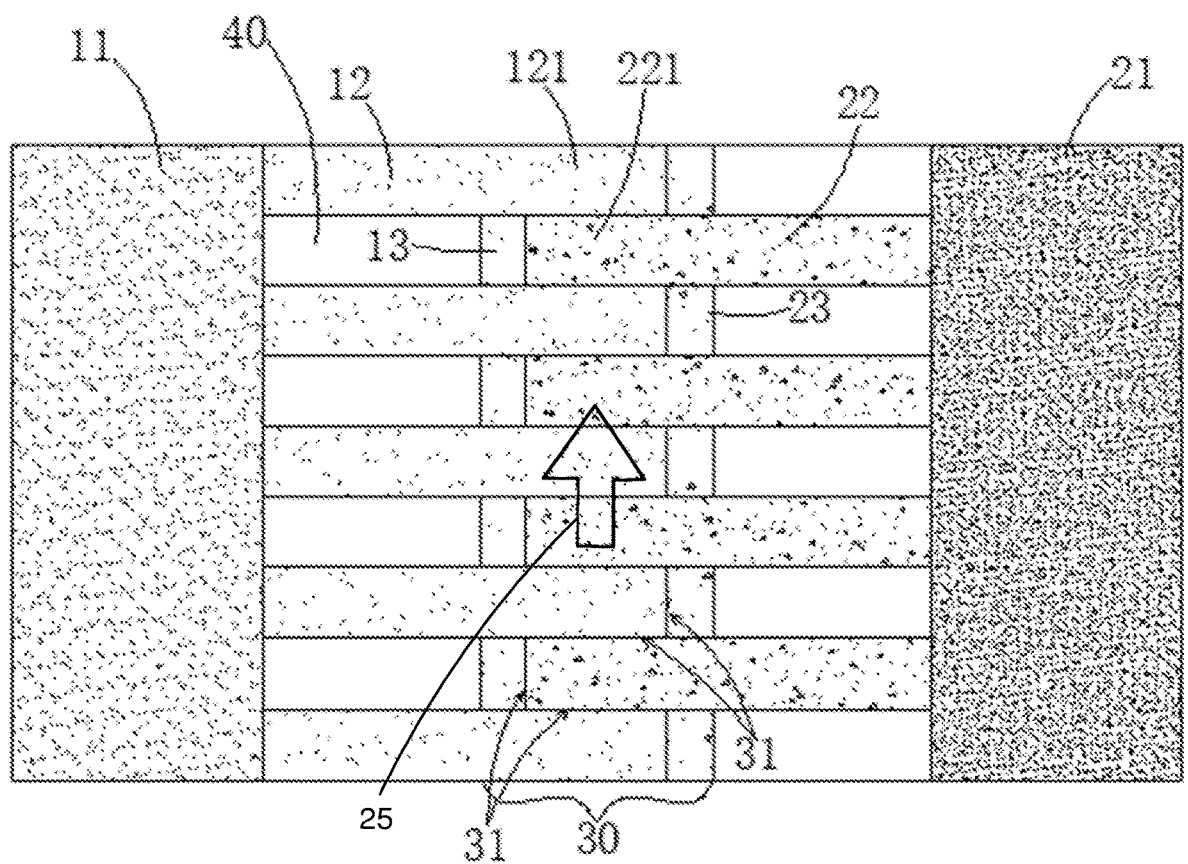
FIG. 8 is a structural diagram of a variation of the second example embodiment of the present disclosure.

FIG. 8 is a structural diagram of a variation of the second example embodiment of the present disclosure. As shown in FIG. 8, in the variation of the second example embodiment, the doping concentration in the second P-type doped region 13 may be lower than the doping concentration in the P-type doped link arms 12. The doping in the second P-type doped region 13 may be P-type doping at a concentration in the range of $1 \times 10^{16}$ cm$^{-3}$ to $1 \times 10^{17}$ cm$^{-3}$. Similarly, the doping concentration in the second N-type doped region 23 may be lower than the doping concentration in the N-type doped link arms 22. The doping in the second N-type doped region 23 may be N-type doping at a concentration in the range of $1 \times 10^{16}$ cm$^{-3}$ to $1 \times 10^{17}$ cm$^{-3}$. Since the optical field distributed at the periphery region of the optical waveguide is weaker, lowering the doping concentration to a proper degree can improve the efficiency-capacitance ratio and efficiency-loss ratio of the whole modulator.

Third Example Embodiment

Figure 9:
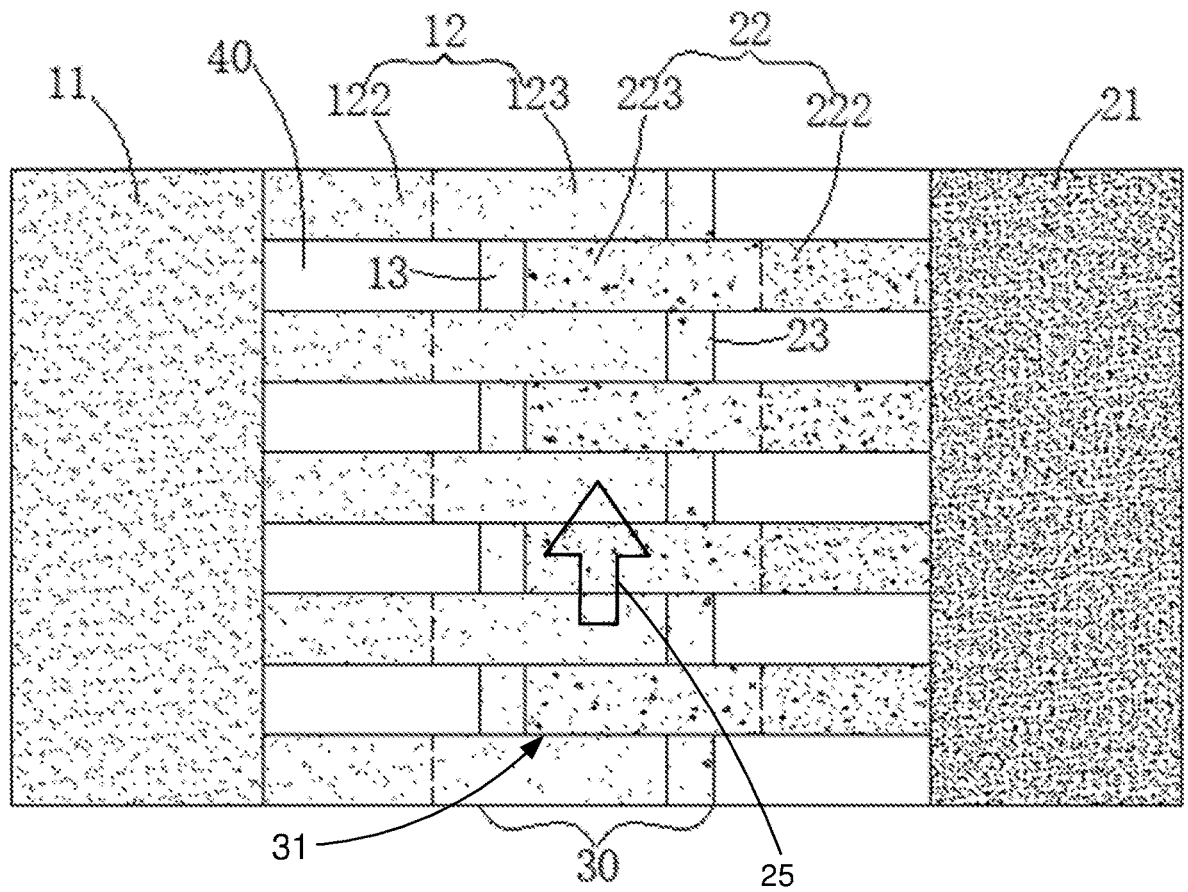
FIG. 9 is a top view of a doped structure of an electro-optic modulator of a third example embodiment of the present disclosure.

FIG. 9 is a top view of a doped structure of an electro optic modulator in a third example embodiment of the present disclosure. As shown in FIG. 9, the third example embodiment differs from the first and second example embodiments in that, in the third example embodiment, each P-type doped link arm 12 has two segments: a P-type medium-high doped segment 122 near the first P-type doped region 11 and a P-type medium doped segment 123 positioned away from the first P-type doped region 11. The doping concentrations in the first P-type doped region 11, P-type medium-high doped segment 122, and P-type medium doped segment 123 decrease sequentially. Each N-type doped link arm 22 also has two segments: an N-type medium-high doped segment 222 near the first N-type doped region 21 and an N-type medium doped segment 223 positioned away from the first N-type doped region 21. The doping concentrations in the first N-type doped region 21, N-type medium-high doped segment 222, and N-type medium doped segment 223 decrease sequentially. The end portions of the P-type medium doped segment 123 and of the N-type medium doped segment 223 are alternately arranged along the direction of light propagation to form PN junction depletion layers 31 perpendicular to the direction of light propagation. These PN junction depletion layers 31 are periodically arranged along the direction of light propagation to form the optical waveguide 30.

In the third example embodiment, the doping in the P-type medium doped segment 123 is P-type doping at a concentration in the range of $1\times10^{17}$ cm$^{-3}$ to $5\times10^{18}$ cm$^{-3}$. The doping in the N-type medium doped segment 223 is N-type doping at a concentration in the range of $1\times10^{17}$ cm$^{-3}$ to $5\times10^{18}$ cm$^{-3}$. The doping in the P-type medium-high doped segment 122 is P+ doping, which is between P++ doping and P doping and in the range of $1\times10^{18}$ cm$^{-3}$ to $1\times10^{19}$ cm$^{-3}$. The doping in the N-type medium-high doped segment 222 is N+ doping, which is between N++ doping and N doping and in the range of $1\times10^{18}$ cm$^{-3}$ to $1\times10^{19}$ cm$^{-3}$.

The doping structure in the third example embodiment increases the doping concentrations in parts of the link arms and further reduces the resistance of the link arms. Furthermore, it will not introduce additional optical losses since the doping concentration is relatively low on the two sides of the PN junction depletion layers that are used as the optical waveguide.

Fourth Example Embodiment

Figure 10:
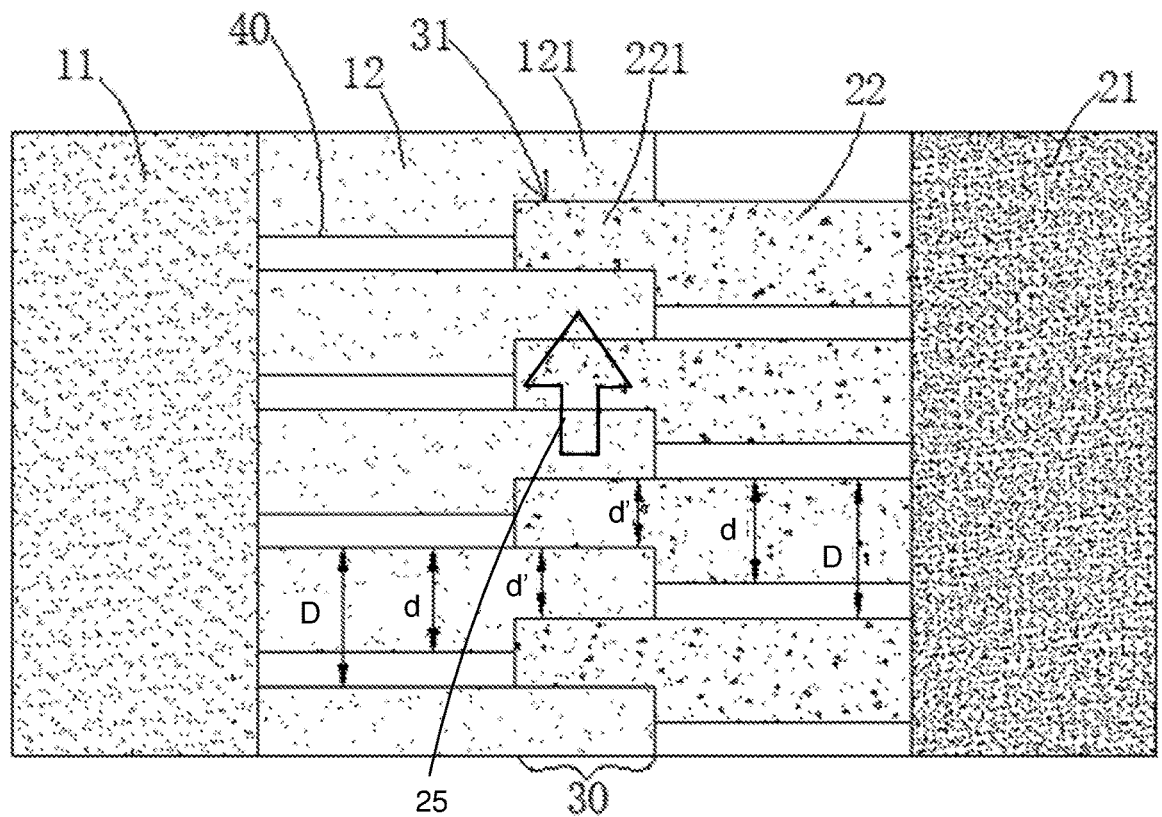
FIG. 10 is a top view of a doped structure of an electro-optic modulator of a fourth example embodiment 4 the present disclosure.

FIG. 10 is a top view of a doped structure of an electro-optic modulator in a fourth example embodiment of the present disclosure. As shown in FIG. 10, the fourth example embodiment 4 differs from the first example embodiment in that, in the fourth example embodiment, the width d of each P-type doped link arm 12 is greater than a width d' of the end portion 121 of the P-type doped link arm 12, and that the duty cycle of the grating structure formed by the P-type doped link arms 12 is greater than 50%. The width d of each N-type doped link arm 22 is greater than the width d' of the end portion 221 of the N-type doped link arm 22, and the duty cycle of the grating structure formed by the N-type doped link arms 22 is greater than 50%. FIG. 10 also shows the grating period D of the grating structure. This structure further increases the cross-sectional area of the doped link arms used for electricity conduction without changing the thickness of the device. Therefore, the resistance of the doped link arms can be effectively reduced, thus facilitating a higher bandwidth of the modulator. Furthermore, in order to reduce additional optical losses, it is best to control the aforementioned duty cycle to be below 80%.

For the doped structure in any of the example embodiments above, if the thickness of the optical waveguide is greater than or equal to 150 nm (for example, the optical waveguide is made from a 220 nm-thick wafer), then the width of the optical waveguide may be set in the range of 300 nm to 800 nm. If the optical waveguide is made from a 270 nm-thick wafer, then the width of the optical waveguide may be set in the range of 200 nm to 800 nm. If the optical waveguide is made from a 340 nm-thick wafer, then the width of the optical waveguide may be set in the range of 100 nm to 800 nm.

In all of the example embodiments above, the preferred dopant for P-type doping is boron, and the preferred dopant for N-type doping is phosphorus.

Figure 11:
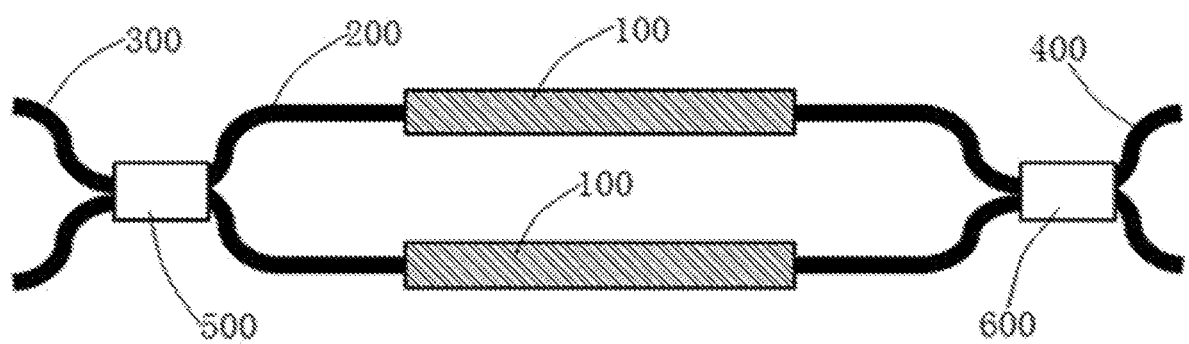
FIG. 11 is a structural diagram of a Mach-Zehnder electro-optic modulator (MZM).

The electro-optic modulator of the embodiments of the present disclosure may be suited to be used in a Mach-Zehnder electro-optic modulator (MZM) as shown in FIG. 11. Of course, the electro-optic modulator of the embodiments of the present disclosure is also suited to be used in electro-optic modulators of other structures or types. As shown in FIG. 11, the electro-optic modulator of the present disclosure serves as a modulation arm (phase shifter) 100 in a MZM. Two electro-optic modulators are disposed side-by-side to constitute two modulation arms (phase shifters) 100 in the MZM. Signal light is inputted through an optical input end 300 of the MZM. After passing through a beam splitter 500, the light is split into two beams, each entering into a modulation arm (phase shifter) 100 through an optical waveguide 200. As a result of modulation by the modulation arms (phase shifters) 100, a phase difference is produced, and interference takes place in a beam combiner 600. Finally, the light is outputted from an optical output end 400.

Embodiments of the present disclosure provide the following benefits. The P-type doped link arms and the N-type doped link arms are alternately arranged along the direction of light propagation to form the periodically arranged PN junction depletion layers perpendicular to the direction of light propagation, thus increasing the effective length of the PN junction depletion layers in the optical waveguide and improving modulation efficiency. Additionally, the duty cycle of the grating structure formed by the doped link arms may be greater than or equal to 50%, thus effectively reducing the resistance of the doped link arms and facilitating a higher bandwidth of the modulator. Furthermore, the doped structure enables an optical signal to work in the TM mode, thus reducing optical losses to a certain extent while increasing modulation efficiency at the same time.

The series of detailed descriptions above is only intended to provide specific descriptions of feasible embodiments of the present application. They are not to be construed as limiting the scope of protection for the present application; all equivalent embodiments or changes that are not detached from the techniques of the present application in essence should fall under the scope of protection of the present application.

What is claimed is:

1. An electro-optic modulator, comprising:
    a doped structure disposed on a silicon substrate, the doped structure comprising an optical waveguide, and a first P-type doped region and a first N-type doped region disposed respectively on two sides of the optical waveguide,
    wherein
    the first P-type doped region is connected to the optical waveguide by means of a plurality of P-type doped link arms,
    the first N-type doped region is connected to the optical waveguide by means of a plurality of N-type doped link arms,
    end portions of the plurality of P-type doped link arms and end portions of the plurality of N-type doped link arms are alternately arranged along a direction of light propagation to form PN junction depletion layers perpendicular to the direction of light propagation, the PN junction depletion layers are periodically arranged along the direction of light propagation to form the optical waveguide, the end portion of each P-type doped link arm is a segment of the P-type doped link arm positioned away from the first P-type doped region, the end portion of each N-type doped link arm is a segment of the N-type doped link arm positioned away from the first N-type doped region, the doping concentration in the first P-type doped region is higher than the doping concentration in the P-type doped link arms, the doping concentration in the first N-type doped region is higher than the doping concentration in the N-type doped link arms, and wherein the electro-optic modulator further comprises a cladding layer disposed on the doped structure, the cladding layer filling gaps between the P-type doped link arms and between the N-type doped link arms.

2. The electro-optic modulator of claim 1, wherein the plurality of P-type doped link arms are disposed along the direction of light propagation to form a first grating structure with a duty cycle in the range of 10% to 80%, and the plurality of N-type doped link arms are disposed along the direction of light propagation to form a second grating structure with a duty cycle in the range of 10% to 80%, the duty cycle being a ratio of a width of each P-type doped link arm or each N-type doped link arm to a grating period of the first or second grating structure.

3. The electro-optic modulator of claim 2, wherein the width of each P-type doped link arm is greater than or equal to the width of the end portion of the P-type doped link arm, and the duty cycle of the first grating structure formed by the P-type doped link arms is in a range of 50% to 80%, and the width of the N-type doped link arm is greater than or equal to the width of the extremity of the N-type doped link arm, and the duty cycle of the grating structure formed by the N-type doped link arms is in a range of 50% to 80%.

4. The electro-optic modulator of claim 1, wherein the doped structure further comprises:

a second P-type doped region connecting two adjacent ones of the P-type doped link arms and disposed at the end of the end portion of one of the plurality of N-type doped link arms; and a second N-type doped region connecting two adjacent ones of the N-type doped link arms and disposed at the end of the end portion of one of the plurality of P-type doped link arms.

5. The electro-optic modulator of claim 4, wherein the doping concentration in the second P-type doped region is equal to or lower than the doping concentration in the P-type doped link arms, and the doping concentration in the second N-type doped region is equal to or lower than the doping concentration in the N-type doped link arms.

6. The electro-optic modulator of claim 1, wherein each of the plurality of P-type doped link arms comprises a P-type medium-high doped segment near the first P-type doped region and a P-type medium doped segment away from the first P-type doped region, the doping concentration in the P-type medium-high doped segment being higher than the doping concentration in the P-type medium doped segment, and each of the plurality of N-type doped link arm comprises a N-type medium-high doped segment near the first N-type doped region and a N-type medium doped segment away from the first N-type doped region, the doping concentration in the N-type medium-high doped segment being higher than the doping concentration in the N-type medium doped segment.

7. The electro-optic modulator of claim 1, wherein a thickness of the optical waveguide is greater than or equal to 200 nm.

8. The electro-optic modulator of claim 7, wherein the optical waveguide has a thickness of 220 nm and a width in a range of 300 nm to 800 nm, or the optical waveguide has a thickness of 270 nm and a width in a range of 200 nm to 800 nm, or, the optical waveguide has a thickness of 340 nm and a width in a range of 100 nm to 800 nm.

9. The electro-optic modulator of claim 7, wherein the P-type doped link arms, the N-type doped link arms, and the optical waveguide are the same in thickness, all of which extend through a top surface and a bottom surface of the doped structure.

10. The electro-optic modulator of claim 1, wherein the electro-optic modulator further comprises two electrodes, the first P-type doped region being electrically connected to one of the two electrodes, and the first N-type doped region being electrically connected to the other one of the two electrodes.

11. An electro-optic modulator, comprising:

a doped structure disposed on a silicon substrate, the doped structure comprising an optical waveguide, and a first P-type doped region and a first N-type doped region disposed respectively on two sides of the optical waveguide, wherein the first P-type doped region is connected to the optical waveguide by means of a plurality of P-type doped link arms, the first N-type doped region is connected to the optical waveguide by means of a plurality of N-type doped link arms, end portions of the plurality of P-type doped link arms and end portions of the plurality of N-type doped link arms are alternately arranged along a direction of light propagation to form PN junction depletion layers perpendicular to the direction of light propagation, the PN junction depletion layers are periodically arranged along the direction of light propagation to form the optical waveguide, the end portion of each P-type doped link arm is a segment of the P-type doped link arm positioned away from the first P-type doped region, the end portion of each N-type doped link arm is a segment of the N-type doped link arm positioned away from the first N-type doped region, the doping concentration in the first P-type doped region is higher than the doping concentration in the P-type doped link arms, the doping concentration in the first N-type doped region is higher than the doping concentration in the N-type doped link arms, and wherein the doped structure further comprises:

a second P-type doped region connecting two adjacent ones of the P-type doped link arms and disposed at the end of the end portion of one of the plurality of N-type doped link arms; and a second N-type doped region connecting two adjacent ones of the N-type doped link arms and disposed at the end of the end portion of one of the plurality of P-type doped link arms.

12. The electro-optic modulator of claim 11, wherein the doping concentration in the second P-type doped region is equal to or lower than the doping concentration in the P-type doped link arms, and the doping concentration in the second N-type doped region is equal to or lower than the doping concentration in the N-type doped link arms.

* * * * *